(No Model.)
F. W. LA CLAIR.
DEVICE FOR STOPPING HOLES IN PNEUMATIC TIRES.
No. 604,768. Patented May 31, 1898.
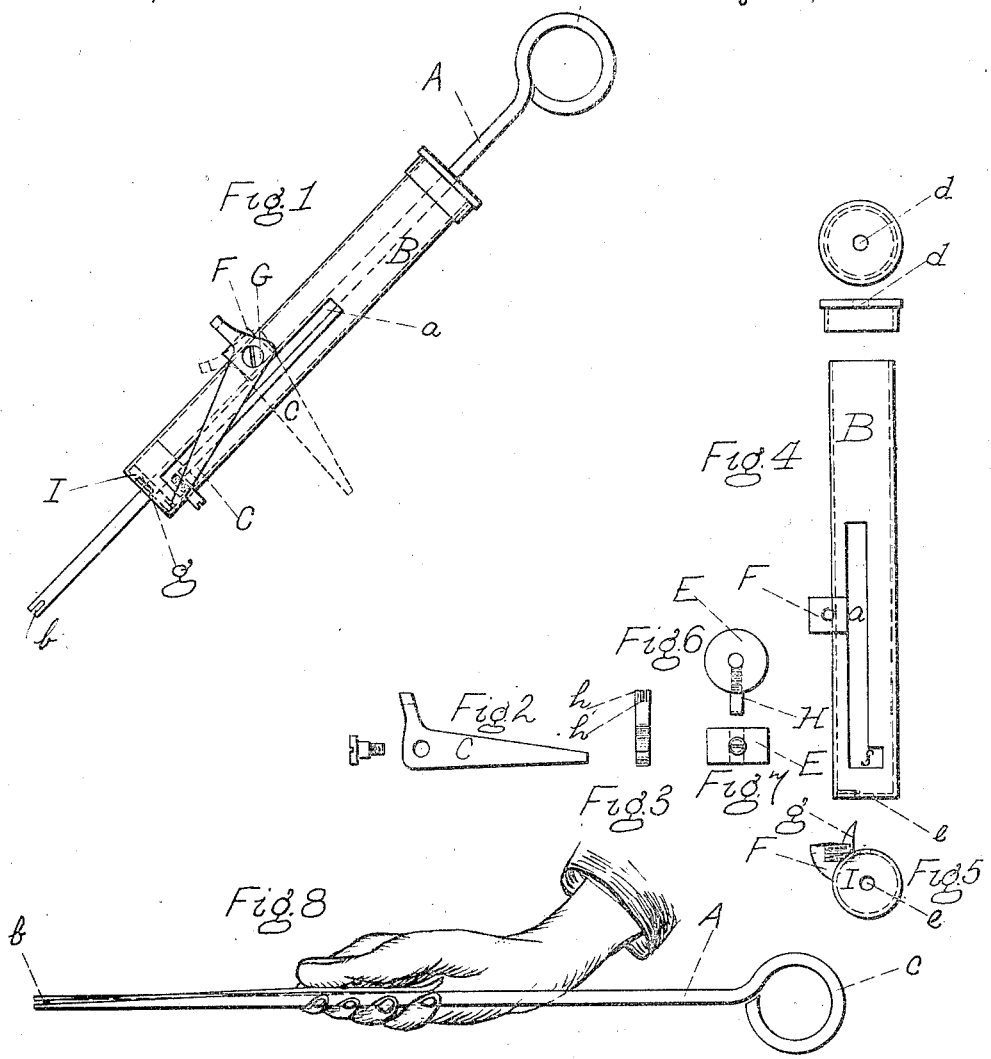
WITNESSES:
Frank S. Bacon.
Chas. A. Hollman.
INVENTOR
Frank W La Clair
BY F. M. Easley
his ATTORNEY.

UNITED STATES PATENT OFFICE.

FRANK W. LA CLAIR, OF WATERBURY, CONNECTICUT.

DEVICE FOR STOPPING HOLES IN PNEUMATIC TIRES.

SPECIFICATION forming part of Letters Patent No. 604,768, dated May 31, 1898.

Application filed January 24, 1898. Serial No. 667,738. (No model.)

*To all whom it may concern:*

Be it known that I, FRANK W. LA CLAIR, a citizen of the United States, residing at Waterbury, in the county of New Haven and State of Connecticut, have invented certain new and useful Improvements in Devices for Stopping Holes or Punctures in Pneumatic Tires or other Substances; and I do declare the following to be a full, clear, and exact description of the invention, such as will enable others skilled in the art to which it appertains to make and use the same.

This invention relates to that class of devices used to mend or fill holes or punctures in pneumatic tires; and the object of my invention is to provide means by which a hole or puncture in a pneumatic tire may be quickly and substantially filled, so as to be air-tight. I attain this object by means of the device or machine illustrated in the accompanying drawings, in which—

Figure 1 is a plan of the device or machine. Fig. 2 is a side elevation of the lever C; Fig. 3, an end view of said lever; Fig. 4, a detail view of the tube, its ends, and lever-support; Fig. 5, an end view of the same; Fig. 6, an end view of the collar with set-screw; Fig. 7, a side view of the same; Fig. 8, a perspective view of the rod A used singly.

Similar letters refer to similar parts throughout the several views.

The rod A, provided with the loop c on one end thereof and the slot b cut into its other and tapered end, is operated with the other parts of the device or machine through the tube B, and when thus operated the said rod carries the collar E, secured thereto by the screw H through the tube-slot a.

The tube B constitutes the frame on or through which each of the other parts of the device or machine operates. The tube B has both of its ends closed or covered, excepting the holes d and e, to admit the rod A, and has the longitudinal slot a and the transverse slot f to admit the screw H and provide a traveling space and lock for the screw H. The tube B is provided at its end through which the tapered end of the rod extends with the cover I, having the projecting lip g, which serves as a guide to hold the strands of rubber in place and is also used to compress the strands together in the operation of unlocking the device, as hereinafter described.

The collar E may be secured to any desired part of the rod A by loosening the screw H, then pushing the rod A through the collar E to the desired position, and tightening the screw H.

The lever-support F is secured to the tube B near the edge of the slot a and is provided with a screw-hole to receive the screw G, which secures the lever C thereto.

The angle-lever C is provided with the slots h h' at its end nearest the screw-hole, which secures said lever to its support F.

This combined device or machine may be operated as follows: by pushing the rod carrying the collar E and the screw H down until the screw H comes to the end of the slot, turning the rod until the screw slips into the locking-slot f, pushing the long end of the angle-lever C against the screw H, inserting the end of a piece of rubber string in one of the slots h in the short end of the angle-lever C, then stretching the rubber string slightly and passing it between the long end of the angle-lever C and the projecting lip g and through the slot b on the end of the rod A, then back between the said long end of the lever and said lip to the short end of the lever, then turning the short end of said lever and repeating until several strands of rubber extend from the short end of said lever between the long end of said lever and said lip and over the end of and through the slot in said rod, the second end of the strand of rubber being passed through the other slot h to secure it, placing a drop of cement upon the strands of rubber near the end of the rod, pushing the end of the rod together with the strands of rubber through the hole or puncture to be filled until the end of the tube A quite or nearly touches the outer surface of the substance containing the hole or puncture, turning the rod B until the screw H comes in line with the slot A, and while holding the tube in its above-described position withdrawing the rod through the hole or puncture. When the rod is turned to the right to bring the screw H in line with the slot a, the long end of the lever is thereby automatically pushed toward the lip $g$ and the strands of rubber at that point are compressed and firmly held until the end of the lever is released by passage of the screw H in the slot $a$ toward the fulcrum of the lever. When the screw H passes the point in the slot $a$ opposite the screw G, the short end of the lever is drawn around by the tension of the strands of rubber until the lever assumes the position shown in Fig. 1 by the dotted lines, when the strands of rubber slip over the short end thereof and are released from the device.

The advantages of this over other devices are that it can be very quickly operated, the puncture or hole is securely stopped, and the most inexperienced person can do as thorough work with it as though skilled in its use.

Having fully described my invention, what I claim as new, and desire to secure by Letters Patent, is—

1. The combination of the rod A provided with a slot in one end thereof; the tube B provided with the longitudinal slot $a$, the transverse slot $f$ and the lever-support F; and the lever C provided with the slots $h\ h'$ in one end thereof substantially as described.

2. The combination of the rod A provided with a slot in one end thereof; the tube B provided with the longitudinal slot $a$, the transverse slot F and the end provided with the lip $g$; and the lever C provided with the slots $h\ h'$.

FRANK W. LA CLAIR.

Witnesses:
FRANK S. BACON,
F. M. PEASLEY.